Dec. 25, 1951

O. H. SCHADE 2,579,971

COLOR TELEVISION SYSTEM

Filed Nov. 26, 1947

INVENTOR.
Otto H. Schade
BY Olin C. Mitchell
ATTORNEY

Patented Dec. 25, 1951 2,579,971

UNITED STATES PATENT OFFICE 2,579,971

COLOR TELEVISION SYSTEM

Otto H. Schade, West Caldwell, N. J., assignor to Radio Corporation of America, a corporation of Delaware Application November 26, 1947, Serial No. 788,135

10 Claims. (Cl. 178—5.4)

The present invention relates to cathode ray camera tube devices and systems for utilizing such devices for the production of video signals representing a subject in an orderly sequence useful for multicolor television operations.

It has been customary in the transmission of colored images by the so-called sequential system of color television transmission to utilize a rotating disk, or an appropriate movable filter device, in connection with the camera or pickup tube. This disk normally includes one or more sets of three filter sectors corresponding respectively to the three composite colors in a tricolor system. Consequently, when the scene to be transmitted is illuminated by white light, the scanning operation of the camera tube produces an output consisting of three trains of television signals each of which represents one of the composite colors. At the receiver or monitor, apparatus is provided for sequentially converting each of these trains of signals into a light image having a color corresponding to that of the filter sector in front of the camera tube lens during that particular time interval. The three individual and differently colored images thus reproduced in rapid succession create the illusion of a multicolored image to an observer.

Systems of the above nature, of course, require the rotating color filter disk or assembly at the transmitter so that each color filter sector of this disk may be successively interposed in the optical light path of the camera tube. The means for driving this disk usually includes a motor operated in synchronism with the scanning operation at the television camera. Additionally, some sort of synchronizing mechanism is desirable so that the motor which rotates a corresponding color filter disk at the receiver or monitor may be maintained in synchronism and in proper phase with the transmitter filter assembly. Such a mechanical system has a number of undesirable features, and it is difficult to obtain in one field a complete neutralization of color changes in the pickup tube where the same photo-sensitive surface elements must respond to different colors in successive fields.

In a patent to Alfred N. Goldsmith, No. 2,343,971, issued March 14, 1944, there is described a method and apparatus particularly suited for the studio lighting of scenes to be transmitted in color. In the system of this patent, the illumination of the set or scene to be televised is performed by sequentially flashing lamps which give a selective radiation of an appropriately colored light corresponding to the desired color components employed in transmission. This illumination or flashing of lamps takes place during the blanking portion of each field-scanning cycle, and a cyclic repetition of, say, red, green and blue flashes from respective lamps may be made in any desired or established order. Thus, during the field retrace time, a high intensity of red light (for example) may be projected onto the scene to be transmitted, and, since the duration of this flash of light is short, the target electrode of the camera tube will be charged with an electrically stored image. The target electrode is subsequently scanned to produce a train of output signals corresponding to a red image. At the end of the scanning interval, a green flash of high intensity light takes place during the field return period, and the target electrode is then scanned to produce a train of signals corresponding to a green image. Following this, a high intensity flash of blue illumination is provided, again during the field retrace time, and the subsequent field-scanning period produces a train of signals corresponding to a blue image. The cycle is then repeated. Inasmuch as the scene is illuminated for each field by only one color component at any particular time, a filter disk in front of the camera is not required, since the light source itself provides suitably color-filtered illumination. The problem of discharging completely the target electrode in each field, however, still remains a serious difficulty.

By means of the present invention, the necessity for illuminating the scene to be televised by lamps corresponding to the various component colors is eliminated and the complete discharge of elements is no longer required. In a preferred embodiment, the light responsive electrode of the camera tube is provided with a plurality of color filter strips extending thereacross at right angles to the direction of line scanning. The width of these color filter strips should preferably be about equal to, or less than, one-third the length of one picture element as defined by the electrical channel, but larger than the diameter of the electron scanning beam, so that in effect each of the normal image element areas of the electrode is divided into separate sub-element areas corresponding to the various component colors, which may, for example, be red, green, and blue.

A system according to the above causes the optical image focused and projected into the pickup tube to produce on each normal image element of the light responsive electrode three separate electrostatic charges corresponding to the amounts of red, green, and blue light reaching such normal image element area from the optical image. When the electron beam scans each line of the target electrode, the red, green, and blue sub-element areas produce successive signals in the usual manner which, if not properly separated, are so close together in the tube output as to produce the usual black-and-white, or monochrome, effect. Accordingly, in order to obtain a color image at the receiver, it is necessary that in one complete field the signals from one group of color areas be so modified with respect to signals from the other color areas that they can be separated. One field scansion might, for example, give signals from the red areas increased in amplitude by a constant amount over the signals from the green and blue areas. Then in the next field scansion the green signals would be transmitted at a level exceeding the signal amplitudes from the red and blue areas. Finally, the third field scansion would transmit blue signals at a raised level. By the use of suitable clipping means in the output of the camera tube, the signal for each successive field scansion that has been raised by a constant amount could be separated from the other two signals.

A preferred manner of producing output signals from the camera tube having one separable color component characteristic is by biasing the image charges on the target electrode by red, green, and blue light projected sequentially onto the light responsive electrode during successive field retrace periods. Such successive flashes of red, green, and blue light for biasing the light responsive electrode may be obtained by successively illuminating three gas or fluorescent lamps giving respectively red, green, and blue light outputs. These lamps may be energized, for example, by pulses produced during the field retrace intervals and synchronized with the operation of the field-scanning generator. It will thus be seen that in accordance with the present invention a sequential color television transmission system is provided which is of the all-electronic type and which, therefore, utilizes no mechanical moving parts such as motors or rotating filter disks. Furthermore, by means of the present invention color carry-over by charge retention in the pickup tube is completely eliminated.

One object of the present invention, therefore, is to provide an improved type of color television transmission system of the so-called sequential type.

A further object of the invention is to provide a sequential color television transmitting system in which no moving mechanical parts are utilized.

A still further object of the invention is to produce output signals by electronic means in a pickup or camera tube from which video signals sequentially representing suitable individual component colors such as red, green, and blue of a tri-color additive system, are discernible.

An additional object of the invention is to provide a television pickup or camera tube with means for simultaneously forming interleaved electrical charges on the normal image element areas of a light responsive surface, these interleaved charges being formed simultaneously by the red, green, and blue light energy projected thereon from an object to be televised with definite sections of elemental areas assigned to one color only so that residual charges cannot cause color mixing, and then producing signals during successive field-scanning intervals representing each one of these colors in proper sequence.

A still further object of the invention is to provide a television camera or pickup tube with means for separating the light from an object to be televised which reaches each of the normal image element areas into red, green, and blue subelement areas, and to provide further means for biasing all the sub-element sections of the surface responsive to one color sequentially by projecting thereon light of a single one of these colors, thus raising the charges on all sub-element area sections representing this one particular color by a constant amount above those charges representing the remaining colors.

Other objects and advantages of the invention will appear from the following description, reference being had to the drawing, in which.

Figures 1, 2, 3, 4:
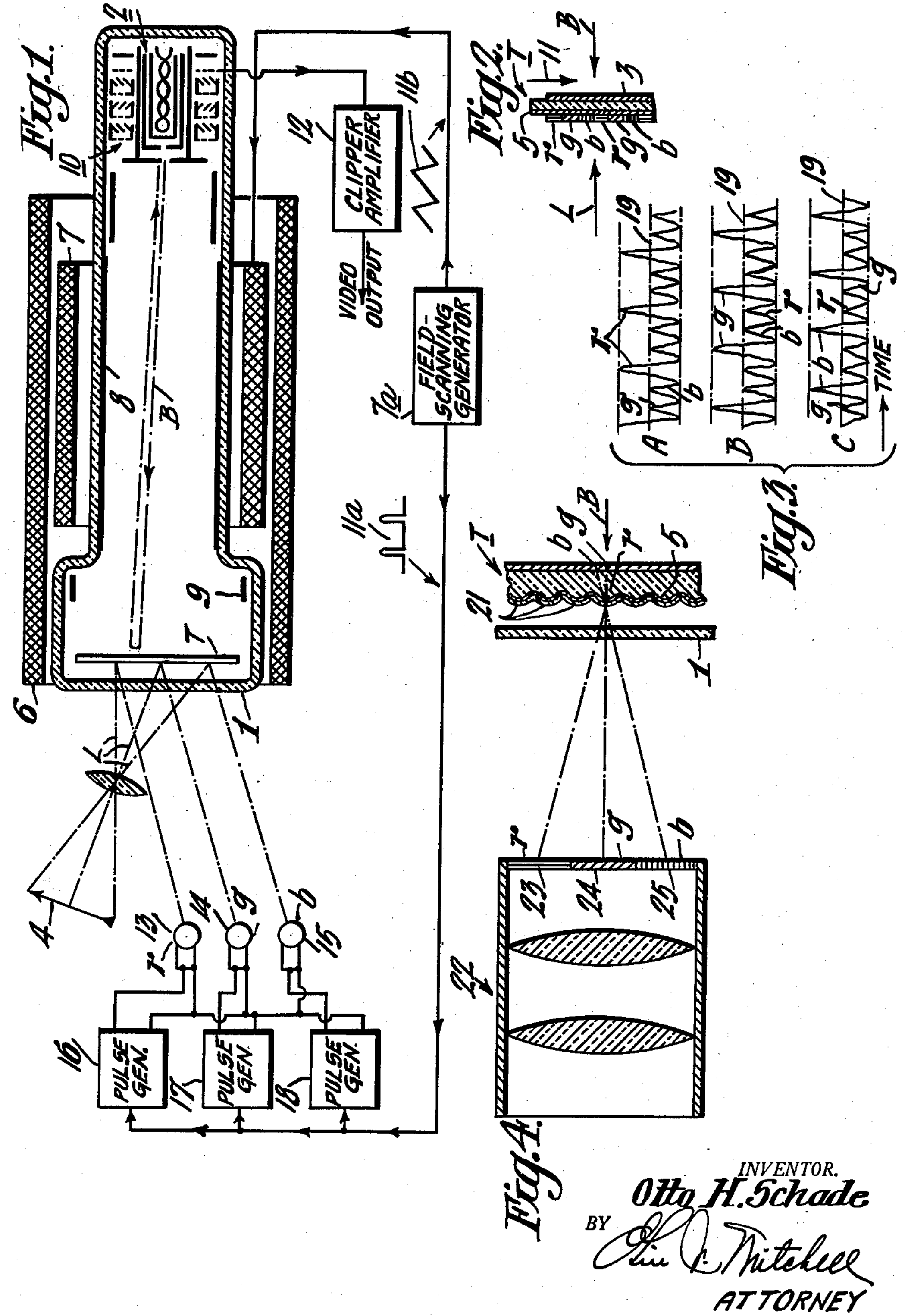
Fig. 1 illustrates in a partly schematic manner a preferred form of color television transmitting system in accordance with the present invention.
Fig. 2 is an enlarged section of a portion of the light responsive electrode included in a camera tube of one form that may be incorporated in the system shown in Fig. 1.
Fig. 3 shows a series of voltage waveforms useful in explaining the operation of the circuit of Fig. 1.
Fig. 4 illustrates a modified form of the system of Fig. 1.

While the present invention is not limited to any particular form of camera tube, it will be assumed for the purpose of illustration that a camera or pickup tube of the Orthicon type is employed. A tube of this nature is fully described in a patent to Albert Rose No. 2,213,176, issued August 27, 1940, and hence its details will not be set forth in the present specification. However, it may be said that the tube includes in general an envelope 1 having an electron gun 2 positioned at one end thereof. At the other end of tube 1 is located a target, or mosaic electrode T, which is of the semi-transparent type preferably consisting of a thin sheet of mica (shown in more detail in Fig. 2). This target T has one surface 3 suitably sensitized in order to produce electrostatic charges through a loss of photoelectrons resulting from the impingement of light rays L on the target T from an object 4 the televising of which is desired. The surface of the mosaic T opposite to the sensitized surface 3 is provided with a transparent metal coating 5.

Any suitable type of focusing and deflecting means may be used in connection with the camera tube of Figure 1, such, for example, as the electro-magnetic focusing coil 6 and the line and field deflection coil unit 7. This unit 7 is energized by suitable line and field deflecting currents of sawtooth waveform from a line-scanning generator (not shown) and from a field-scanning generator illustrated schematically in the drawing at 7a. Tube 1 may also include the usual wall coating electrode 8, a decelerating ring 9, and a multiplier structure 10. For a full description of these tube elements, reference is made to the U. S. patent of Paul K. Weimer, No. 2,433,941, issued January 6, 1948, and hence the detailed description of these elements is not believed to be necessary herein.

To separate the light rays L from the object 4 being televised into their component colors such as red, green, and blue, a plurality of color filter strips or coatings designated as *r*, *g*, and *b*, respectively, extend across the mosaic T and are laid upon or under the surface of the metal coating 5. These color filter strips extend at right angles to the direction of line scanning which is indicated in Fig. 2 by the arrow 11. The strips r, g, and b should be very narrow so that they effectively divide each normal image element area of the sensitized surface or mosaic 3 into red, green, and blue sub-element areas. In order that this may be accomplished, the width of each color filter strip is made smaller than the picture element, but the diameter of the electron scanning beam B of the camera tube 1 is much smaller so that it can adequately resolve signals from the red, green, or blue sub-element areas.

As a result of the use of such a series of color filter strips, the optical image focused on the target T from the object 4 produces on each normal image element area of the sensitive surface 3 separate charges corresponding to the respective amounts of red, green, and blue light reaching such normal image element area. When the electron scanning beam B scans a line of the target, the red, green, and blue sub-element areas produce successive output signals in the usual manner. If not properly separated, however, these signals are all within one normal picture element time in the tube output and produce therefore, in the normal channel, a monochrome, or black-and-white, image at the receiver. In order that the system of the present invention be suitable for the production of color images, it is necessary that the target T be scanned for one complete field with the signals representing one color raised by a constant level or amount over the signals representing the remaining colors. Then, in the next field scansion, the signals from one of the remaining colors should be raised, and so on. By the use of suitable clipping means forming part of the amplifier 12, signals representing the one color that have been raised in level above the signals representing the other colors during any particular field-scanning period may be separated from the remaining colors.

Accordingly, red, green, and blue light for biasing the mosaic of the camera tube 1 is obtained from a plurality of gas or fluorescent type lamps 13, 14, and 15, the lamp 13 giving a red color, the lamp 14 giving a green color, and the lamp 15 giving a blue color. These lamps are adapted to project light onto the mosaic T, and are energized by pulses generated during the field retrace time by the pulse generators 16, 17, and 18 respectively. The latter in turn are synchronized with the scanning operation of tube 1 by the regulating voltage pulse 11a produced by the field-scanning generator 7a as a function of the production of the sawtooth deflecting current 11b supplied to the field deflection coil portion of the deflecting unit 7. Pulse generators such as shown by the block diagrams 16, 17, and 18 are well known in the telegraph and television fields, and, therefore, need not be described in detail. However, they may consist of thyratrons regulated by the voltage pulses 11a.

The operation of the above-described system will now be set forth. As the electron beam B of tube 1 scans the sensitized surface 3, it neutralizes the charge on each sub-elemental area of the mosaic produced by the previous impingement thereon of light rays L from the object 4. This charge is in turn proportional to the quantum of red, green, and blue light from the object which reaches such sub-elemental area.

Assume now that the scanning beam B is at the bottom of the target and is about to be moved to the top of the target during the field retrace period. During this retrace period, a pulse is formed by the pulse generator 16 in the circuit of the red lamp 13, and the red light reaching the sensitive surface 3 of the target produces a bias charge on the sub-elemental sections of the picture elemental areas opposite the red filter strips r. However, there is no bias on the sub-elemental area sections opposite the green and blue filter strips g and b, because the red light from the lamp 13 does not pass through these filter strips. At or before the time that the beam reaches the top of the target in preparation for another field scansion, the pulse from the generator 16 subsides, and the scanning beam B finds the charges produced by the red image rays from the object 4 "boosted" by the charges from the red rays of the biasing lamp 13. However, the scanning beam B finds the green and blue areas with charges produced solely by the image light alone. Consequently, as the beam B scans the red, green, and blue sections of the elemental areas along each line of the mosaic, it will transmit to the amplifier 12 signals r for the "red" sections raised by a constant bias level (graph A, Fig. 3) and signals g and b for the "green" and "blue" sections, respectively which are not biased above the black level. This relation of signal output for the three colors will continue for the scansion and discharge of all areas in one complete field. While the beam B is making the next retrace from the bottom to the top of the mosaic, biasing green light (for example) is projected onto the entire mosaic by a pulse formed in the generator 17 which energizes the green lamp 14. As indicated by the graph B of Fig. 3, the green charges will now be "boosted" above the red and blue charges throughout the whole field interval, and the signals transmitted to the amplifier 12 will have raised green signals throughout this particular field-scanning period. In the same manner, the pulse generator 18 will energize the blue lamp 15 during the retrace interval at the end of this field-scanning period so as to bias the blue charges on the target. Thus the electron beam B will scan the mosaic to produce raised blue signals during this entire scanning interval, as indicated in Fig. 3 by the graph C. The above operation is repeated cyclically, so that each color is raised in level over the others in successive field scansions.

The clipping means in the amplifier 12 may be of any well-known type and need not be described in detail. It permits only the signals in the upper level above a cut-off line such as shown at 19 (Fig. 3) to be utilized, so that the red, green, and blue signals are properly separated in successive fields. These signals, of course, are proportional to the red, green and blue colors, respectively, in the object 4 which is being televised.

Instead of forming the color filter strips on the target T as best shown in Fig. 2, the red, green, and blue color filters may be placed outside the tube envelope 1, as illustrated in Fig. 4. In this modification, the transparent target T is molded or formed so as to have a plurality of very small cylindrical lenses 21 covering the transparent metal coating 5. The axis of each of these lenses 21 is perpendicular to the direction of line scansion. The object to be televised is focused on the target T through an optical assembly 22 having red, green, and blue filter sections 23, 24, and 25, respectively. The cylindrical lenses 21 may, for example, produce results similar to those produced by the so-called "Kodacolor" film used in color photography. The same red, green, and blue biasing light arrangement which is shown at 13 through 18 in Fig. 1 biases these three subelemental color filter images successively by illuminating the optical assembly 22 from the front during the field retrace periods, and the beam B then scans the target T to produce red, green, and blue signals in successive scansions as previously described for the embodiment of Fig. 1.

It should be understood that the present invention, in general, covers an improved color television transmitting system of the sequential type, and it is not dependent upon any particular apparatus for receiving and reproducing the color images. Many different types of receiving and reproducing systems are known in the art, and it is within the scope of the present invention to employ any known device which is capable of utilizing successive trains of color-component signals developed in the manner above described.

While the present invention has been set forth in connection with a camera or pickup tube of the Orthicon type, it is equally applicable for use with the so-called image Orthicon which produces charges on its target electrode through the release of secondary electrons under the impact of photo-electrons in turn released from a separate photo-cathode, as described in the above-mentioned patent of Paul K. Weimer. In this case, of course, the red, green, and blue bias light, as well as the image light rays, would fall upon the separate photo-cathode instead of on the target T directly.

One main advantage of the present invention is the fact that an incomplete discharge of any of the target areas does not cause color carry-over since any sub-elemental section will never receive any other color or light except that assigned to it. The invention, therefore, produces a result in one tube and photo-surface as if three completely separate mosaics were used.

While I have described a particular embodiment for carrying out the principles of the invention, it will be apparent that various other forms may be used within the scope of the appended claims.

I claim:

1. In a television system of the type in which an optical image is focused upon the photosensitive surface in a camera tube to thereby produce a corresponding electrostatic charge image on a target electrode, the combination of means for separating the light rays from the optical image which reach each normal image element area of the said photosensitive surface into a plurality of color components so that a portion of each image element area will be charged by light of one component color only, means for increasing the charge by a substantially constant amount during regularly recurring intervals on that portion only of each image element area that is associated with light of a particular component color, means for causing said charge increasing means to act sequentially on the different color-component area portions of said photosensitive surface, means for scanning the target electrode by an electron beam in said camera tube to thereby derive output signals representative of the charges on each group of different color-component area portions, and means for separating from said output signals a particular signal representative of that group of color-component area portions acted upon by the said charge-increasing means during the immediately preceding interval.

2. A television system according to claim 1, in which said light-ray-separating means comprises a plurality of color filter elements affixed to the said target electrode.

3. A television system according to claim 2, in which said color filter elements are arranged in the form of strips extending substantially at right angles to the line-scanning direction of said electron beam.

4. A television system according to claim 1, in which said charge-increasing means comprises a plurality of light sources selectively energized as a function of the scanning operation of said electron beam and adapted to illuminate the said photosensitive electrode.

5. In a television system of the type in which light from an optical image is directed through a lens assembly toward the photosensitive surface of a target electrode in a camera tube to thereby set up on said target electrode a corresponding image in stored electrostatic charge, means formed as a unit with the said lens assembly for separating the light from the optical image which reaches each normal image element area of the said photosensitive surface into a plurality of color components so that a portion of each such image element area will be charged by light of one component color only, means for increasing the charge by a constant amount during regularly recurring intervals on that portion only of each image element area associated with light of the same component color, means for causing said charge-increasing means to act sequentially on the different color-component area portions of said photosensitive surface, means for scanning said target electrode by an electron beam in said camera tube to thereby derive output signals representative of the charges on each group of different color-component area portions, and means for separating from said output signals a particular signal representative of that group of color-component area portions acted upon by the charge-increasing means during the immediately preceding interval.

6. A television system according to claim 5, in which the surface of the said target electrode opposite to the photosensitive surface is formed with a plurality of cylindrical lenses each of which is approximately of a diameter equal to or less than the diameter of each normal image element area of the said photosensitive surface.

7. A television system according to claim 5, in which said charge-increasing means comprises a plurality of light sources selectively energized as a function of the scanning operation of said camera tube and adapted to direct light through said lens assembly toward said target electrode.

8. In a system including a cathode ray beam pickup tube having a sensitized target electrode therein, the combination of a plurality of stationary color filters, means for imaging an object on said target electrode by light passing through all of said color filters simultaneously, means for scanning said target electrode by line and field operations of the cathode ray beam of said tube, and means for illuminating said target electrode directly and simultaneously through all of said color filters only between each field-scanning operation, the light produced by said last-mentioned means being of colors produced sequentially one for each field and corresponding to the colors passed by said filters.

9. The combination of claim 8, in which the said filters are respectively colored red, green, and blue.

10. In a television system of the type in which an optical image is focused upon the photosensitive surface in a camera tube to thereby produce a corresponding electrostatic charge image on a target electrode, the combination of means for separating the light rays from the optical image which reach each normal image element area of the said photosensitive surface into a plurality of color components so that a portion of each image element area will be charged by light of one component color only, means for increasing the charge by a substantially constant amount during regularly recurring intervals on that portion only of each image element area that is associated with light of a particular component color, means for causing said charge increasing means to act sequentially on the different color-component area portions of said photosensitive surface, means for scanning the target electrode by an electron beam in said camera tube to thereby derive output signals representative of the charges on each group of different color-component area portions, means for separating from said output signals a particular signal representative of that group of color-component area portions acted upon by the said charge-increasing means during the immediately preceding interval, said charge-increasing means comprising a plurality of light sources selectively energized as a function of the scanning operation of said electron beam and adapted to illuminate the said photosensitive electrode, and wherein said light sources are ion discharge lamps designed to respectively emit light of each of the said component colors.

OTTO H. SCHADE.

REFERENCES CITED

The following references are of record in the file of this patent:

UNITED STATES PATENTS

| Number | Name | Date |
|---|---|---|
| 2,310,863 | Leverenz | Feb. 9, 1943 |
| 2,343,971 | Goldsmith | Mar. 14, 1944 |
| 2,413,075 | Schade | Dec. 24, 1946 |
| 2,431,115 | Goldsmith | Nov. 18, 1947 |
| 2,479,820 | De Vore | Aug. 23, 1949 |

FOREIGN PATENTS

| Number | Country | Date |
|---|---|---|
| 458,791 | Great Britain | Dec. 28, 1936 |